US012798993B2

(12) United States Patent
Li et al.

(10) Patent No.: US 12,798,993 B2
(45) Date of Patent: Nov. 17, 2026

(54) FAST IONIC CONDUCTOR COATED LITHIUM-TRANSITION METAL OXIDE MATERIAL AND PREPARATION METHOD THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Bin Li, Foshan (CN); Changdong Li, Foshan (CN); Shenghe Tang, Foshan (CN); Weijian Liu, Foshan (CN); Dingshan Ruan, Foshan (CN); Zhenpeng Xu, Foshan (CN); Xingyu Wu, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 649 days.

(21) Appl. No.: 18/230,198

(22) Filed: Aug. 4, 2023

(65) Prior Publication Data

US 2023/0382763 A1 Nov. 30, 2023

Related U.S. Application Data

(63) Continuation of application No. PCT/CN2021/142288, filed on Dec. 29, 2021.

(30) Foreign Application Priority Data

Mar. 31, 2021 (CN) ........................ 202110345374.7

(51) Int. Cl.

| | |
|---|---|
| ***C10G 53/00*** | (2006.01) |
| ***C01G 53/506*** | (2025.01) |
| ***H01M 10/0525*** | (2010.01) |

(52) U.S. Cl.

CPC ...... *C01G 53/506* (2025.01); *H01M 10/0525* (2013.01); *C01P 2002/74* (2013.01); *C01P 2004/03* (2013.01); *C01P 2006/40* (2013.01)

(58) Field of Classification Search

CPC .................. C01G 53/50; C01G 51/50; H01M 10/0525; H01M 10/052; H01M 4/131;

(Continued)

(56) References Cited

FOREIGN PATENT DOCUMENTS

| | | |
|---|---|---|
| CN | 103490060 A | 1/2014 |
| CN | 103500827 A | 1/2014 |

(Continued)

OTHER PUBLICATIONS

Jaephil Cho et al., Comparison of Al2O3- and AlPO4-coated LiCoO2 cathode materials for a Li-ion cell, Journal of Power Sources, Apr. 26, 2005, pp. 58-64, Elsevier.

(Continued)

*Primary Examiner* — Kaity V Chandler
(74) *Attorney, Agent, or Firm* — Westbridge IP LLC

(57) ABSTRACT

The invention belongs to the technical field of lithium ion battery materials, and discloses a fast ionic conductor coated lithium-transition metal oxide material having a chemical formula of $(1-x)Li_{1+a}(Ni_{(1-m-n)}Co_nMn_m)_{1-b}M_bO_2 \cdot xLi_cAl_dTi_eM'_fM''_g(PO_4)_3$ and a preparation method thereof. The fast ionic conductor coated lithium-transition metal oxide material of the present invention has lower impedance, excellent (Continued)

cycle performance and safety performance under high voltage, especially when the charging voltage is greater than 4.62V, 4.65V, or higher. The Lithium-transition metal oxide can be obtained by a primary calcination, and the final product of lithium-transition metal oxide material coated with fast ionic conductor can be obtained by a secondary calcination.

13 Claims, 4 Drawing Sheets

(58) Field of Classification Search
CPC ....... H01M 4/1391; H01M 2300/0068; H01M 4/366; H01M 4/62; H01M 4/525; H01M 4/628; H01M 4/505; H01M 2004/021; H01M 2004/028; H01M 4/48; H01M 4/485; H01M 10/0562; C01P 2002/74; C01P 2004/03; C01P 2006/40; Y02E 60/10
See application file for complete search history.

(56) References Cited

FOREIGN PATENT DOCUMENTS

| | | | | | |
|---|---|---|---|---|---|
| CN | 104037407 | A | * | 9/2014 | ........ H01M 10/0525 |
| CN | 104037407 | B | | 4/2017 | |
| CN | 109244439 | A | | 1/2019 | |
| CN | 109585839 | A | | 4/2019 | |
| CN | 109879331 | A | | 6/2019 | |
| CN | 110858643 | A | | 3/2020 | |
| CN | 113161550 | A | * | 7/2021 | ............ H01M 4/525 |

OTHER PUBLICATIONS

Yong Jeong Kim et al., Electrochemical Stability of Thin-Film LiCoO2 Cathodes by Aluminum-Oxide Coating, Mar. 15, 2003, pp. 1505-1511, American Chemical Society.
International Search Report of PCT Patent Application No. PCT/CN2021/142288 issued on Mar. 11, 2022.

* cited by examiner

FAST IONIC CONDUCTOR COATED LITHIUM-TRANSITION METAL OXIDE MATERIAL AND PREPARATION METHOD THEREOF

CROSS-REFERENCE TO RELATED APPLICATIONS

The present application is a continuation application of PCT application No. PCT/CN2021/142288 filed on Dec. 29, 2021, which claims the benefit of Chinese Patent Application No. 202110345374.7 filed on Mar. 31, 2021. The contents of all of the aforementioned applications are incorporated by reference herein in their entirety.

TECHNICAL FIELD

The invention belongs to the technical field of lithium ion battery materials, and specifically relates to a lithium-transition metal oxide material coated with a fast ionic conductor and a preparation method thereof.

BACKGROUND

Layered cathode materials for Lithium-ion batteries have higher capacity, discharge plateau and compaction density, and are currently one of the most fully researched and most widely used cathode materials for commercial lithium-ion batteries. Lithium-ion cathode materials are in direct contact with an electrolyte and are easily corroded by the electrolyte, followed by dissolution of Co, Mn, Ni and other transition metals. Then the materials' original layered structure is destroyed, and the electrolyte is oxidized and decomposed, which produces gas, and finally resulting in a rapid decay of battery capacity and safety problems such as battery bulging, or even burning and explosion.

Coating other materials on the surface of lithium-containing transition metal oxide cathode materials can effectively reduce the contact area between the cathode material and an electrolyte, reduce the dissolution amount of the transition metals such as Co, Mn, and Ni, and improve structural stability and cycle performance. Commonly used coating materials are metal oxides, such as ZnO, $Al_2O_3$, $La_2O_3$, $TiO_2$, $ZrO_2$, etc. This type of material has a stable structure and does not react with an electrolyte so as to protect a cathode material. But most of the oxides are electronically insulated. Coating with the oxides will increase the electronic conductivity of a cathode material and reduce the capacity. Besides coating materials can be metal phosphates, such as $AlPO_4$, $Li_3PO_4$, $LiPO_3$, $Li_3Al(PO_4)_2$, $LiMgPO_4$, etc. The structures of this kind of materials can promote the capacity retention rate, improve the lithium ion diffusion coefficient and thermal stability in a charged state. However, phosphate coatings cannot avoid the corrosion of the electrolyte on the surface of a cathode material under high voltage, and the protection ability under high voltage is limited.

Yong Jeong Kim et al. used a sputtering method to coat a layer of $Al_2O_3$ with a thickness of about 30 nm on the surface of a lithium cobalt oxide cathode material. The results show that the $Al_2O_3$ coated lithium cobalt oxide has better structural stability and capacity retention rate during a half-cell cycle at 2.75~4.4V. But in the first 80 cycles, the lithium ion diffusion coefficient of the $Al_2O_3$ coated lithium cobalt oxide cathode material is lower than that of the uncoated lithium cobalt oxide cathode material, indicating the oxide coating affected the capacity performance to a certain extent and the overall performance is reduced (see Chem. Mater. 2003, 15, 1505-1511).

The related art discloses a preparation method of alumina-coated nickel-cobalt-manganese ternary cathode material. The method comprises forming a of $Al_2O_3$ coating layer on the surface of a ternary cathode material to inhibit side reactions between the material and an electrolyte, and at the same time improve safety performance and cycle performance of the battery. However, the coating layer $Al_2O_3$ is not an excellent conductor for lithium ion transportation. While improving the cycle performance of the battery, it also increases the internal resistance of the battery and sacrifices the specific discharge capacity of the battery. Coated ternary cathode material is prone to the problem of delamination between the coating layer and the material surface, as well as the problems in the coating amount and coating uniformity.

Jaephil Cho et al. used a precipitation coating method to prepare $AlPO_4$-coated lithium cobalt oxide. Compared with uncoated lithium cobalt oxide and $Al_2O_3$-coated lithium cobalt oxide, during a half-cell cycle at 3.0~4.5V, the $AlPO_4$-coated lithium cobalt oxide batteries have better structural stability and capacity retention rate, and the lithium ion diffusion coefficient and thermal stability in the charged state are the highest. But there are problems such as the matching of the cathode material and the coating material, and under high voltage the cathode material is corroded by the electrolyte (see Journal of Power Sources, 2005, 146, 58-64).

The related art discloses a lithium cobalt oxide composite material coated with a lithium super-ion conductor. A lithium super-ion conductor is coated on the surface of a layered lithium cobalt oxide material by a solid-phase mixing method or a precipitation coating method. Layered coating of small particles of the lithium super-ion conductor is uniformly formed on the surface of the lithium cobalt oxide material particles and the preparation method is disclosed. The phosphate ions in the lithium super-ion conductor combines with the lithium in the lithium cobalt oxide material to form $Li_3PO_4$. The above method is only tested to have capacity retention rate under C is 90% after 50 cycles under 4.6V at 0.7 C, which does not reflect the cycle performance under higher voltage. Meanwhile, because the lithium super-ion conductor was directly coated on the cathode material, it is prone to mismatch and fall off during the cycles.

Due to the structural differences between the layered electrode material and the coating material, directed coating of a fast ionic conductor has the shortage of poor interface contact and the coating is likely to fall off during the cycles in use, resulting in problems such as diving during cycles.

SUMMARY OF THE INVENTION

The present invention aims to solve at least one of the technical problems existing in the above-mentioned prior art. To this end, a first objective of the present invention is to provide a fast ionic conductor coated lithium-transition metal oxide material; the second object of the present invention is to provide a method for preparing such a fast ionic conductor coated lithium-transition metal oxide material. The third objective of the present invention is to provide the application of the lithium-transition metal oxide material coated with the fast ionic conductor. The lithium-transition metal oxide material prepared by the present invention has lower impedance, excellent cycle performance and safety performance at high voltage, especially when the charging voltage is greater than 4.62V or even 4.65V.

In order to achieve the aforementioned objectives, the following technical solution is adopted in the invention.

A fast ionic conductor coated lithium-transition metal oxide material, having a chemical formula of $(1-x)Li_{1+a}(Ni_{(1-m-n)}Co_nMn_m)_{1-b}M_bO_2 \cdot xLi_cAl_dTi_eM'_fM''_g(PO_4)_3$; wherein M is at least one selected from the group consisting of Ba, La, Ti, Zr, V, Nb, Cu, Mg, B, S, Sr, Al, Sc, Y, Ga, Zn, W, Mo, Si, Sb and Ca; said M' is an oxide of one or two elements selected form the group consisting of La, Al, Sc, Ti, Y, V or Zr; said M" is an oxide of one element selected from the group consisting of Ni, Se, Fe, Mn and Co; wherein $0<x\leq 0.1$, $0\leq a\leq 0.1$, $0<b\leq 0.1$, $0\leq m\leq 1$, $0\leq n\leq 1$, $0\leq c\leq 1$, $0<d\leq 1$, $0<e\leq 2$, $0\leq f\leq 2$, $0\leq g\leq 2$, $1\times c+3\times d+4\times e=9$.

Preferably, the structure of the fast ionic conductor coated lithium-transition metal oxide material comprises an inner layer, a surface layer, and a transition layer formed during a reaction.

Preferably, the lithium-transition metal oxide material has a layered structure, and has a chemical formula of $(1-x)Li_{1+a}(Ni_{(1-m-n)}Co_nMn_m)_{1-b}M_bO_2$, and M is at least one selected from the group consisting of Ba, La, Ti, Zr, V, Nb, Cu, Mg, B, S, Sr, Al, Sc, Y, Ga, Zn, W, Mo, Si, Sb and Ca, wherein $0\leq a\leq 0.1$, $0<b\leq 0.1$, $0\leq m\leq 1$, $0\leq n\leq 1$.

Preferably, the chemical formula of the fast ionic conductor is $Li_cAl_dTi_eM'_fM''_g(PO_4)_3$, and M' is an oxide of one or two elements selected from the group consisting of La, Al, Sc, Ti, Y, V, and Zr; said M" is an oxide of one element selected from the group consisting of Ni, Se, Fe, Mn, Co, wherein $0\leq c\leq 1$, $0<d\leq 1$, $0<e\leq 2$, $0\leq f\leq 2$, $0\leq g\leq 2$, wherein $1\times c+3\times d+4\times e=9$.

Preferably, the coated lithium-transition metal oxide material is prepared by a solid-phase method, and has a particle size of 2-27 μm.

Preferably, the preparation method of the fast ionic conductor comprises a solid-phase calcinating method or a liquid-phase precipitation-calcinating method.

Preferably, the preparation method of the fast ionic conductor coated lithium-transition metal oxide material comprises a solid-phase mixing method or a precipitation coating method.

The present invention also provides a method for preparing the fast ionic conductor coated lithium-transition metal oxide material, comprising the following steps:

1) Mixing a lithium source, a transition metal compound and a M-containing compound and stirring, calcinating, and crushing to obtain a lithium-transition metal oxide primary powder;
2) Mixing the primary lithium-transition metal oxide powder with M' and M", calcining, crushing, and screening to obtain a lithium-transition metal oxide material powder;
3) Dissolving a crosslinking agent in a mixture of alcohol and water to obtain a solution A, dissolving a lithium salt, an aluminum salt, and a phosphorus source in an alcohol respectively, and stirring to obtain a solution B;
4) Mixing the solution A and the solution B, stirring, heating, and drying, slightly disaggregating a resulting product to obtain a fast ionic conductor precursor, subjecting the fast ionic conductor precursor to calcination, crushing, and screening to obtain a fast ionic conductor intermediate product;
5) Mixing the fast ionic conductor intermediate product with the lithium-transition metal oxide material powder and performing calcination, followed by slightly disaggregating a resulting mixture to obtain the fast ionic conductor coated lithium-transition metal oxide material; in step 1), The M-containing compound is at least one of an M-containing oxides, an M-containing hydroxide, an M-containing acetate, an M-containing carbonate or an M-containing basic carbonate; M is at least one selected from the group consisting of Ba, La, Ti, Zr, V, Nb, Cu, Mg, B, S, Sr, Al, Sc, Y, Ga, Zn, W, Mo, Si, Sb and Ca; in step 2), M' is an oxide of one or two elements selected from the group consisting of La, Al, Sc, Ti, Y, V and Zr, and M" is an oxide of one element selected from the group consisting of Ni, Se, Fe, Mn and Co.

Preferably, in step 1), the lithium source is one or two selected from the group consisting of lithium carbonate and lithium hydroxide.

Preferably, in step 1), the transition metal compound is at least one selected from the group consisting of a cobalt source, a nickel source and a manganese source; the transition metal compound is at least on selected from the group consisting of cobalt tetraoxide, cobalt oxyhydroxide, cobalt hydroxide, nickel-cobalt-manganese oxide, nickel-cobalt-manganese hydroxide, manganese hydroxide, nickel hydroxide, nickel oxide and manganese oxide.

Preferably, in step 1), the calcination is carried out at 750-1100° C., more preferably at 800-1090° C.

Preferably, in step 1), the calcination is carried out for 3-15 hours, more preferably 5-14 hours.

Preferably, in step 1), the lithium-transition metal oxide primary powder has a particle size of 1 to 23 μm.

Preferably, in step 2), M' is an oxide of one or two elements selected from the group consisting of La, Al, Ti, V and Zr.

Preferably, in step 2), M" is an oxide of one element selected from the group consisting of Ni, Se, Mn and Co.

Preferably, in step 2), the calcination is carried out at 700-1020° C., more preferably at 800-1010° C.

Preferably, in step 2), the calcination is carried out for 3-12 hours, and more preferably, for 5-10 hours.

Preferably, in step 2), the lithium-transition metal oxide material powder has a particle size of 1.5-26 μm.

Preferably, in step 3), the ethanol and water are in a weight-to-volume ratio (g/mL) of 100 (mL):1 (g)-98 (mL):1 (g).

Preferably, in step 3), the alcohol is one selected from the group consisting of methanol, ethanol and propanol, and further preferably, the alcohol is ethanol.

Preferably, in step 3), the crosslinking agent is tetrabutyl titanate.

Further preferably, the tetrabutyl titanate and the ethanol are in a weight-to-volume ratio (g/mL) of 1 (g):5 (mL)-1 (g):100 (mL), more preferably 1 (g):5 (mL)-1 (g):80 (mL).

Preferably, in step 3), the lithium salt is at least one selected from the group consisting of lithium carbonate and lithium acetate.

Preferably, in step 3), the aluminum salt is at least one selected from the group consisting of aluminum nitrate and aluminum acetate.

Preferably, in step 3), the phosphorus source is at least one selected from the group consisting of ammonium dihydrogen phosphate, lithium dihydrogen phosphate, diammonium hydrogen phosphate, phosphoric acid, lithium phosphate and a phosphate ester.

More preferably, the phosphate ester is at least one selected from the group consisting of phosphate monoester and phosphate diester.

Preferably, in step 3), the concentration of the lithium salt, aluminum salt, and phosphorus source in the solution B is 0.02-2.5 mol/L respectively, more preferably, the concentration of the lithium salt, aluminum salt and phosphorus source in the solution B is 0.03-2.0 mol/L, respectively.

Preferably, in step 4), the stirring is carried out for 0.2-2.0 hours, and more preferably, for 0.5-1.5 hours.

Preferably, in step 4), the heating comprises the steps of heating the mixture to 40-100° C., stirring and evaporating to dryness, and more preferably, the heating comprises the steps of heating the mixture to 50-80° C., stirring and evaporating to dryness.

Preferably, in step 4), the drying is carried out in an oven for 10-15 hours, and more preferably in an oven for 8-12 hours.

Preferably, in step 4), the calcinating is carried out at 300-900° C., and more preferably, the at 400-700° C.

Preferably, in step 4), the calcination is carried out for 1-10 hours, more preferably 2-8 hours.

Preferably, in step 5), after the fast ionic intermediate product and the lithium-transition metal oxide material powder are mixed, the calcination is carried out at 300-900° C.; further preferably, at 400-800° C.

Preferably, in step 5), the calcination is carried out for 1-10 hours, more preferably 2-8 hours.

Preferably, in step 5), the fast ionic conductor intermediate product and the lithium-transition metal oxide material powder are in a mass ratio of (0.01-0.05):(0.95-0.99).

Preferably, in step 5), the weight of the fast ionic conductor does not exceed 5% of the total weight of the fast ionic conductor coated lithium-transition metal oxide material; further preferably, does not exceed 3% of the total weight of the fast ionic conductor coated lithium-transition metal oxide material.

Preferably, in steps 4 and 5), the slightly disaggregating is carried out by methods of performing screening on a vibrating sieve, mechanical milling, or jet milling.

The present invention also provides another method for preparing a fast ionic conductor coated lithium-transition metal oxide material, comprising the following steps:

1) Mixing a lithium source, a transition metal compound, and a M-containing compound thoroughly, performing calcination and crushing to obtain a lithium-transition metal oxide primary powder;
2) Dissolving a cross-linking agent, a lithium salt, an aluminum salt and a phosphorus source in an alcohol respectively, mixing the result solutions and stirring to obtain a mixed solution a;
3) Dissolving M' and M" in an acidic alcohol to obtain a mixed solution b;
4) Adding the lithium-transition metal oxide primary powder into an alcohol solution, stirring to disperse to obtain a lithium-transition metal oxide suspension;
5) Adding the lithium-transition metal oxide suspension to the mixed solution b, stirring, heating and evaporating to dryness, drying, slightly disaggregating a resulting product to obtain a lithium-transition metal oxide intermediate product;
6) Adding the lithium-transition metal oxide intermediate product to the mixed solution a, stirring, heating and evaporating to dryness, then drying to obtain a dried product, subjecting the dried product to calcination, twin rolling, and slightly disaggregating to obtain a fast ionic conductor coated lithium-transition metal oxide material; in step 1), the M-containing compound is at least one selected from the group consisting of an M-containing oxides, an M-containing hydroxide, an M-containing acetate, an M-containing carbonate and an M-containing basic carbonate; and M is at least one selected from the group consisting of Ba, La, Ti, Zr, V, Nb, Cu, Mg, B, S, Sr, Al, Sc, Y, Ga, Zn, W, Mo, Si, Sb and Ca; in step 3), M' is an oxide of one or two elements selected from the group consisting of La, Al, Sc, Ti, Y, V and Zr and the M" is an oxide of one element selected from the group consisting of Ni, Se, Fe, Mn and Co.

Preferably, in step 1), the lithium source is at least one selected from the group consisting of lithium carbonate and lithium hydroxide.

Preferably, in step 1), the transition metal compound is at least one selected from the group consisting of a cobalt source, a nickel source and a manganese source; the transition metal compound is at least one selected from the group consisting of cobalt tetraoxide, cobalt oxyhydroxide, cobalt hydroxide, nickel-cobalt-manganese oxide, nickel-cobalt-manganese manganese hydroxide, manganese hydroxide, nickel hydroxide, nickel oxide and manganese oxide.

Preferably, in step 1), the calcination is carried out at 750-1100° C., more preferably the at 800-1090° C.

Preferably, in step 1), the calcination is carried out for 3-15 hours, more preferably for 5-14 hours.

Preferably, in step 1), the lithium-transition metal oxide primary powder has a particle size of 1 to 23 μm.

Preferably, in steps 2) to 4), the alcohol is one selected from the group consisting of methanol, ethanol and propanol, and further preferably, the alcohol is ethanol.

Preferably, in step 2), the crosslinking agent is tetrabutyl titanate.

Further preferably, the tetrabutyl titanate and the ethanol are in a weight-to-volume ratio (g/mL) of 1 (g):5 (mL)-1 (g):100 (mL), more preferably 1 (g):5 (mL)-1 (g):80 (mL).

Preferably, in step 2), the lithium salt is at least one selected from the group consisting of lithium carbonate and lithium acetate, and the aluminum salt is at least one selected from the group consisting of aluminum nitrate and aluminum acetate.

Preferably, in step 2), the lithium salt, aluminum salt and phosphorus source are dissolved in ethanol to reach a concentration of 0.01-2 mol/L respectively, and more preferably, to reach a concentration of 0.02-1.5 mol/L.

Preferably, in step 2), the phosphorus source is at least one selected from the group consisting of ammonium dihydrogen phosphate, lithium dihydrogen phosphate, diammonium hydrogen phosphate, phosphoric acid, lithium phosphate, or a phosphate ester.

More preferably, the phosphate ester is at least one selected from the group consisting of phosphate monoester, phosphate diester and phosphate triester.

Preferably, in step 3), the mixed solution b is an acidic ethanol solution containing M' and M", and the major elements in M' and M" are in the form of ions with a concentration of 0.02-1.5 mol/L respectively.

Preferably, in step 5), the stirring is carried out for 0.5-5 hours, and further for 1-3 hours;

Preferably, in step 5), the steps of heating, stirring and evaporating to dryness are carried at 50-90° C., and further preferably, at 60 to 80° C.

Preferably, in step 5), the drying is carried out at 70-120° C., more preferably at 80-110° C.

Preferably, in step 5), the drying is carried out for 5-20 hours, more preferably for 8-16 hours.

Preferably, in step 5), the slightly disaggregating comprises subjecting a dried material to vibrating screening, mechanical milling, or jet milling; and more preferably, subjecting to vibrating screening.

Preferably, in step 6), the calcination is carried out at a temperature of 300-900° C., more preferably at a temperature of 400-800° C.; followed by holding the temperature for 3-12 hours, more preferably for 5-10 hours.

Preferably, in step 6), the weight of the fast ionic conductor does not exceed 5% of the total weight of the fast ionic conductor coated lithium-transition metal oxide material; further preferably, it does not exceed 3% of the total weight of the fast ionic conductor coated lithium-transition metal oxide material.

According to some embodiments of the present invention, the fast ionic conductor $Li_cAl_dTi_eM'_fM''_g(PO_4)_3$ is produced by a reaction of the fast ionic conductor intermediate product $Li_cAl_dTi_e$ $(PO_4)_3$ with the oxides M' and M", and the reaction is carried out by methods including but not limited to spraying, drying, wet mixing, magnetron sputtering, multiple co-precipitation method, etc.

According to some embodiments of the present invention, the use of other types of fast ionic conductor intermediate products to react with the oxides M' and M" in surface layer to produce fast ionic conductor products containing M' and M" are all within the scope of the present invention.

The mechanism of the present invention is as follows: the movement of ions in a crystal depends on the crystal structure and chemical bonds. When a large number of defects are generated in a cathode material through doping and surface modification, there are occupied vacancies near the migrating ions, and the number of the vacancies is far more than the number of ions. Under this condition, the movement of ions is accelerated to form a fast ionic conductor. A continuous ion transmission channel is then formed in a fast ionic conductor, which further accelerates ion conduction. Under a high voltage, in order to suppress the phase change and improve the cycle performance, it is usually to dope with more elements on the electrode material. And with more elements doped, the lithium ion conductivity decreases while the interface reaction intensifies under high voltage. In order to reduce the side reaction of the interface reaction, the lithium-transition oxide is often coated with more inert oxides. This coating increases the impedance, which is not conducive to the capacity performance improvement. When the fast ionic conductor is coated on the surface of the material, the fast ionic conductor on the surface will decompose to form an open ion transmission channel, which can improve the lithium ion transmission capacity. However, the lithium-transition metal oxide material and the fast ionic conductor have different types of structures. There is a compatibility problem on the surface.

Compared with the conventional fast ionic conductor coating material, the cathode material provided by the present invention can form a transitional layer structure on the shallow surface layer during the cycle, and form an open ion transmission channel, so at to significantly increase the diffusion path of lithium ions and improve the lithium ion conductivity of the cathode material. Besides, the structure of the surface layer composed of lithium phosphorus oxide, lithium titanium oxide and lithium aluminum oxide has a very stable framework and can provide more active sites for electrochemical reactions, effectively increasing the active specific surface area for lithium ion deintercalation reaction. The surface structure is high voltage resistant, thereby improving the cycle performance under a high voltage.

Compared with the prior art, the beneficial effects of the present invention are as follows:

The fast ionic conductor coated lithium-transition metal oxide of the present invention has lower impedance, excellent cycle performance and safety performance under a high voltage, especially a charging voltage greater than 4.62V, 4.65V or higher. The Lithium-transition metal oxide can be obtained by a primary calcination, and a final product of the lithium-transition metal oxide material coated with fast ionic conductor can be obtained by a secondary calcination.

1) The present invention uses the fast ionic conductor $Li_cAl_dTi_eM'_fM''_g$(PO4)3 to coat a lithium-transition metal oxide cathode material so as to improve the lithium ion conductivity of the surface of the material, thereby the material has a better cycle performance under high voltages. The fast ionic conductor will generate $Li_3PO_4$, $LiTiO_3$, $AlPO_4$ etc. during the cycle, which greatly improves the lithium ion transmission performance.
2) In the present invention M' and M" oxides are firstly coated on the surface of the lithium-transition metal oxides followed by forming $Li_cAl_dTi_eM'_fM''_g$(PO4)3 on the surface layer through a reaction with $Li_cAl_dTi_e$ $(PO_4)_3$ at a high temperature. The M' and M" oxides coating can improve the matching degree between the cathode material and the surface layer. An intermediate transition part is presented during the method, by which the performance of lithium ion conductivity and the stability of the surface interface structure are comprehensively balanced, thereby improving the protection performance.
3) Due to the existence of the transition part, the phenomenon of internal and external penetration will occur during the calcinating process, which improves the stability between the internal layer and the surface fast ionic conductor layer, improves the corrosion resistance of the cathode surface layer, and reduces the risk of surface layer falling off during the cycle, improve structural stability.
4) The present invention uses both the liquid phase method and the solid phase method to synthesize the fast ionic conductor intermediate product, which continues to react with the surface layer coated with M' and M" of the cathode material to produce the fast ionic conductor product $Li_cAl_dTi_eM'_fM''_g(PO_4)_3$. During the cycle, a structure similar to a CEI film is easily formed on the surface of the electrode, which plays a role in protecting the electrode and improving the stability during the high-voltage cycle.
5) The method provided by the present invention only comprises steps of stirring, mixing and heating to obtain lithium-transition metal oxide materials coated with fast ionic conductor. The coating is more uniform with the fast ionic conductors of relatively higher purity, and the surface layer of the cathode material has a transition layer. The charge-discharge cycle performance of the product is significantly better than the lithium-transition metal oxide material without the coating treatment.

DETAILED DESCRIPTION

Figure 1:
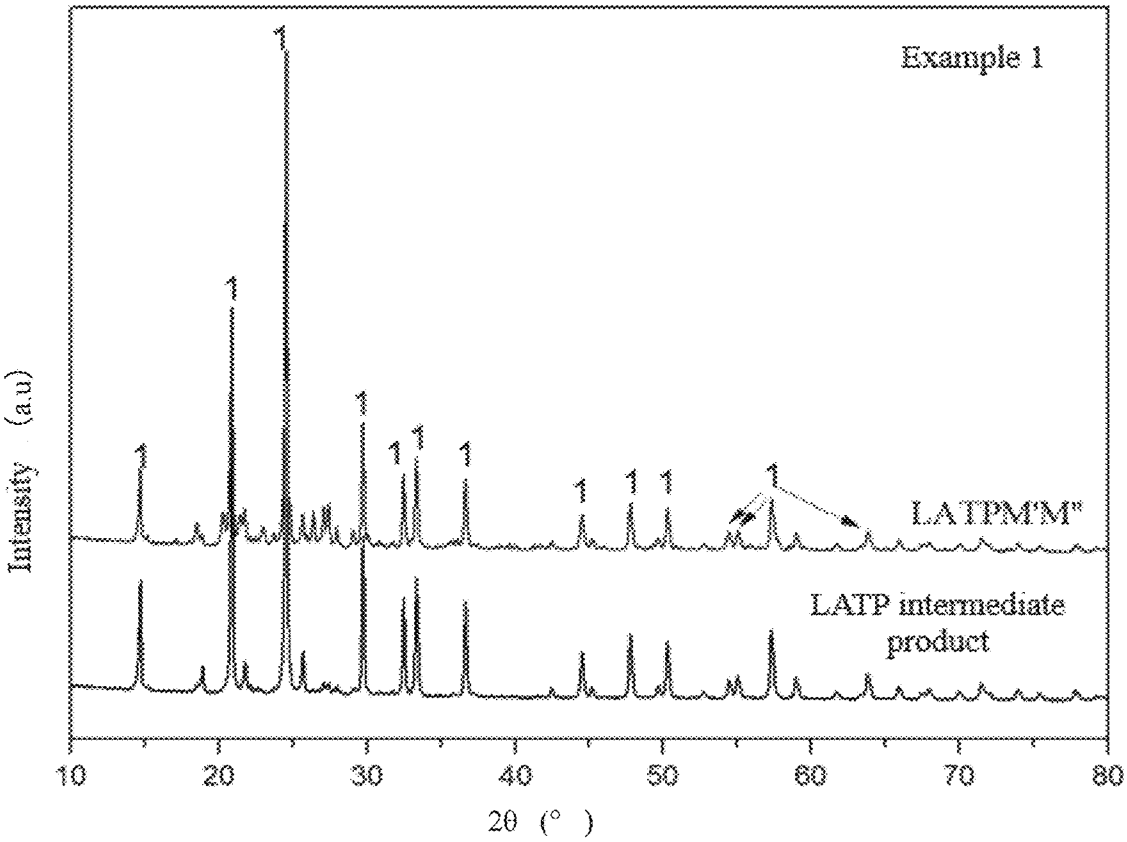
FIG. 1 is an X-ray diffraction spectrum of the intermediate lithium fast ionic conductor and the product of a reaction between the intermediate lithium fast ionic conductor and the compound M'·M" in Example 1 of the present invention.

Hereinafter, the concept of the present invention and the technical effects produced by it will be described clearly and completely with reference to the embodiments, so as to fully understand the purpose, features and effects of the present invention. Obviously, the described embodiments are only a part of the applications of the present invention, rather than all of them. Based on the embodiments of the present invention, other embodiments obtained by those skilled in the art without creative work belong to the scope of protection of the present invention.

In the present invention, $Li_cAl_dTi_eM'_fM''_g(PO_4)_3$ is abbreviated as LAT M'M"P or LATPM'M"; $Li_cAl_dTi_e(PO_4)_3$ is abbreviated as LATP.

Example 1

The preparation method of the fast ionic conductor coated lithium cobalt oxide material of this embodiment comprises the following specific steps:

(1) Weighing and adding lithium carbonate, cobalt tetroxide, magnesium oxide, aluminum oxide, and lanthanum oxide according to the molar ratio of the chemical formula $Li_{1.04}Co_{0.955}Mg_{0.01}Al_{0.03}La_{0.005}O_2$ in a three-dimensional mixer; adding balls in a mass ratio of 1.5:1 and mixing for 3 hours to obtain a mixed powder; subjecting the mixed powder to calcination at a temperature of 1000° C., and holding the temperature for 10 hours, followed by natural cooling and crushing to obtain a modified lithium cobalt oxide primary powder.

(2) Weighing the modified lithium cobalt oxide primary powder and M' oxide ($TiO_2$:$A_2O_3$=1:1) and M" oxide ($MnO_2$) in a molar ratio according to the chemical formula $(Li_{1.04}Co_{0.955}Mg_{0.01}Al_{0.03}La_{0.005}O_2)_{0.995}\cdot(M'\cdot M'')_{0.005}$ an placing in a three-dimensional mixer, adding balls in a mass ratio of 1:1 and performing three-dimensional mixing for 1.5 hours to obtain a mixed powder, subjecting the mixed powder to calcination at a temperature of 800° C. for 6 hours, followed by natural cooling and sieving to obtain 1000 g of modified lithium cobalt oxide.

(3) Weighing tetrabutyl titanate in a molar ratio according to the chemical formula $Li_{1.0}Al_{0.5}Ti_{1.5}(PO_4)_3$ and dissolving it in 50 mL ethanol, then adding 0.5 mL deionized water, stirring evenly, and then weighing and dissolving lithium acetate, aluminum acetate, titanium acetate, and ammonium dihydrogen phosphate in a small amount of ethanol respectively, and stirring evenly. First, adding the tetrabutyl titanate ethanol aqueous solution dropwise to the ammonium dihydrogen phosphate solution, followed by dropwise adding lithium acetate, aluminum acetate, and titanium acetate solutions; stirring for 1.5 hours to obtain a mixture which is heated to 60° C., stirring and evaporating to dryness, then drying in an oven at 80° C. for 15 hours, subjecting a resulting dried powder to calcination at a temperature of 800° C., holding the temperature for 6 hours to obtain a lithium fast ionic conductor intermediate product after natural cooling.

(4) Placing the fast ionic conductor intermediate product and the modified lithium cobalt oxide powder in a three-dimensional mixer and mixing for 5 hours, and then subjecting a resulting uniformly mixed powder to calcination in an air atmosphere at a temperature of 500° C., and then holding the temperature for 6 hours and natural cooling to obtain a product of lithium cobalt oxide material coated with 3% fast ionic conductor.

Since the fast ionic conductor intermediate product will react with M'·M" on the surface of the modified lithium cobalt oxide powder, a stable shallow fast ionic conductive layer is formed by chemical interactions among the lithium-transition metal material, M'·M" and fast ionic conductor intermediate product on the surface. During a cycling, the cathode material and its coating layer will not fall apart easily.

Example 2

(1) The preparation method of the fast ionic conductor coated nickel cobalt manganese material of this embodiment comprises the following specific steps:

Weighing and adding lithium carbonate, nickel-cobalt-manganese hydroxide (Ni:Co:Mn=8:1:1), magnesium oxide, aluminum oxide, and lanthanum oxide in a molar ratio according to the chemical formula of $Li_{1.04}(Ni_{0.8}Co_{0.1}Mn_{0.1})_{0.955}Mg_{0.01}Al_{0.03}Zr_{0.005}O_2$ in a three-dimensional mixer; adding balls in a mass ratio of 1.5:1 and mixing for 3 hours to obtain a mixed powder; subjecting the mixed powder to calcination at a temperature of 800° C., and holding the temperature for 10 hours, followed by natural cooling and crushing to obtain a modified ternary NiCoMn-811 primary powder.

(2) Weighing the ternary NiCoMn-811 primary powder and M' ($TiO_2$:$B_2O_3$=1:1) and M" ($SeO_2$) in a molar ratio according to the chemical formula of $(Li_{1.04}(Ni_{0.8}Co_{0.1}Mn_{0.1})_{0.955}Mg_{0.01}Al_{0.03}Zr_{0.005}O_2\cdot(M'\cdot M'')_{0.005}$ and placing in a three-dimensional mixer, adding balls in a mass ratio of 1:1 and performing three-dimensional mixing for 1.5 hours to obtain a mixed powder, subjecting the mixed powder to calcination at a temperature of 500° C. for 6 hours, followed by natural cooling and sieving to obtain 1000 g of modified ternary NiCoMn-811.

(3) Weighing tetrabutyl titanate in a molar ratio according to the chemical formula $Li_{1.1}Al_{0.5}Ti_{1.5}(PO_4)_3$ and dissolving it in 50 mL ethanol, then adding 0.5 mL deionized water, stirring evenly, and then weighing and dissolving lithium acetate, aluminum acetate, titanium acetate, and ammonium dihydrogen phosphate in a small amount of ethanol respectively, and stirring evenly. First, adding the tetrabutyl titanate ethanol aqueous solution dropwise to the ammonium dihydrogen phosphate solution, followed by dropwise adding lithium acetate, aluminum acetate, and titanium acetate solutions; stirring for 1.5 hours to obtain a mixture which is heated to 60° C., stirring and evaporating to dryness, then drying in an oven at 80° C. for 15 hours, subjecting a resulting dried powder to calcination at a temperature of 800° C., holding the temperature for 6 hours to obtain a lithium fast ionic conductor intermediate product after natural cooling.

(4) Placing the fast ionic conductor intermediate product and the modified ternary NiCoMn-811 in a three-dimensional mixer and mixing for 5 hours, and then subjecting a resulting uniformly mixed powder to calcination in an air atmosphere at a temperature of 500° C., and then holding the temperature for 6 hours and natural cooling to obtain a product of 3% fast ionic conductor coated nickel cobalt manganese material.

Example 3

The preparation method of the fast ionic conductor coated lithium cobalt oxide material of this embodiment comprises the following specific steps:

(1) Weighing and adding lithium carbonate, cobalt tetroxide, magnesium oxide, aluminum oxide, and lanthanum oxide according to the molar ratio of the chemical formula of $Li_{1.04}Co_{0.955}Mg_{0.01}Al_{0.03}La_{0.005}O_2$ in a three-dimensional mixer; adding balls in a mass ratio of 1.5:1 and mixing for 3 hours to obtain a mixed powder; subjecting the mixed powder to calcination at a temperature of 1000° C., and holding the temperature for 10 hours, followed by natural cooling and crushing to obtain a modified lithium cobalt oxide primary powder.

(2) Weighing the modified lithium cobalt oxide primary powder, M' ($TiO_2$:$B_2O_3$=1:1) and M" ($MnO_2$) in a molar ratio according to the chemical formula $(Li_{1.04}Co_{0.955}Mg_{0.01}Al_{0.03}La_{0.005}O_2)_{0.995}\cdot(M'\cdot M'')_{0.005}$ an dissolving in 0.1 mol/L nitric acid then diluting with 200 ml ethanol to obtain a mixed solution 4 with a cation concentration of 0.04 mol/L; dissolving $Li_{1.04}Co_{0.955}Mg_{0.01}Al_{0.03}La_{0.005}O_2)_{0.995}$ in 1 L ethanol to obtain a suspension, then mixing the suspension with the mixed solution 4, stirring for 10 min, heating and evaporating to dryness at 80° C., followed by drying in an oven at 100° C. to obtain a 1000 g of modified lithium cobalt oxide secondary powder after performing a light dissociation.

(3) Weighing tetrabutyl titanate in a molar ratio according to the chemical formula $Li_{1.1}Al_{0.5}Ti_{1.5}(PO_4)_3$ and dissolving it in 50 mL ethanol, then adding 0.5 mL deionized water, stirring evenly, and then weighing and dissolving lithium acetate, aluminum acetate, titanium acetate, and ammonium dihydrogen phosphate in a small amount of ethanol respectively, and stirring evenly. First, adding the tetrabutyl titanate ethanol aqueous solution dropwise to the ammonium dihydrogen phosphate solution, followed by dropwise adding lithium acetate, aluminum acetate, and titanium acetate solutions; stirring for 1.5 hours to obtain a mixture which is heated to 60° C., stirring and evaporating to dryness, then drying in an oven at 80° C. for 15 hours, subjecting a resulting dried powder to calcination at a temperature of 800° C., holding the temperature for 6 hours to obtain a lithium fast ionic conductor intermediate product after natural cooling.

(4) Placing the fast ionic conductor intermediate product and the modified lithium cobalt oxide secondary powder in a three-dimensional mixer and mixing for 5 hours, and then subjecting a resulting uniformly mixed powder to calcination in an air atmosphere at a temperature of 500° C., and then holding the temperature for 6 hours and natural cooling to obtain a product of lithium cobalt oxide material coated with 5% fast ionic conductor.

Example 4

The method is roughly the same as in Example 1, except that the lithium-transition metal oxide used is a ternary layered material 622 series, the primary calcination is carried out at a temperature of 700° C., and the additives used for doping are zirconia oxide, alumina oxide and boron oxide with a doping amount of 0.02%, 0.02%, 0.02% respectively. After natural cooling, 5% fast ionic conductor coated modified ternary 622 material product is obtained.

Example 5

The method is roughly the same as in Example 1, except that the lithium-transition metal oxide used is a ternary layered material 523 series, the primary calcination is carried out at a temperature of 900° C., and the additives used for doping are zirconia oxide, alumina oxide and magnesia oxide with a doping amount of 0.03%, 0.02%, 0.02% respectively. M' and M" are titanium oxide and cobalt oxide respectively, and a 4% fast ionic conductor coated modified ternary 523 material product is obtained.

Example 6

The method is roughly the same as in Example 3. The difference is that the lithium-transition metal oxide used is a ternary layered material 622 series, the primary calcination temperature is 720° C., and the additives used for doping are zirconium oxide and strontium oxide, with a doping amount of 0.03%, 0.02% respectively. After natural cooling, 5% fast ionic conductor coated modified ternary 622 material product is obtained.

Example 7

The method is roughly the same as in Example 3. The difference is that the lithium-transition metal oxide used is a ternary layered material 523 series, the primary calcination is carried out at a temperature of 920° C., and the doping additives are zirconia oxide and alumina oxide with a doping amount of 0.03%, 0.04% respectively. M' and M" are titanium oxide and cobalt oxide, respectively, and a 3% fast ionic conductor coated modified ternary 523 material product is obtained.

Comparative Example 1

The preparation method of the modified lithium cobalt oxide material of this comparative example comprises the following specific steps:

(1) Weighing lithium carbonate, cobalt tetroxide, magnesium oxide, aluminum oxide, and lanthanum oxide in a molar ratio according to the chemical formula of $Li_{1.04}Co_{0.955}Mg_{0.01}Al_{0.03}La_{0.005}O_2$ and placing in a three-dimensional mixer, performing three-dimensional mixing for 3 hours with a ball to powder mass ratio of 1.5:1 until uniformly to obtain a mixed powder, subjecting the mixed powder to calcination at a temperature of 1000° C., and holding the temperature for 10 hours, and a modified lithium cobalt oxide primary powder is obtained after natural cooling and crushing.

(2) Weighing the modified lithium cobalt oxide primary powder, M'($TiO_2$:$A_2O_3$=1:1) and M"($MnO_2$) in a molar ratio according to the chemical formula of $(Li_{1.04}Co_{0.955}Mg_{0.01}Al_{0.03}La_{0.005}O_2)_{0.995}\cdot(M'\cdot M'')_{0.005}$ and placing in a three-dimensional mixer, the, performing three-dimensional mixing for 1.5 hours with a ball-to-powder ratio of 1:1 until uniformly to obtain a mixed powder, subjecting the mixed powder to calcination at a temperature of 800° C. for 6 hours, and a modified lithium cobalt oxide is obtained after natural cooling and crushing.

Comparative Example 2

The preparation method of the fast ionic conductor coated lithium cobalt oxide material of this embodiment comprises the following specific steps:

(1) Weighing and adding lithium carbonate, cobalt tetroxide, magnesium oxide, aluminum oxide, and lanthanum oxide according to the molar ratio of the chemical formula $Li_{1.04}Co_{0.955}Mg_{0.01}Al_{0.03}La_{0.005}O_2$ in a three-dimensional mixer; performing three-dimensional mixing for 3 hours with a ball-to-powder mass ratio of 1.5:1 until uniformly to obtain a mixed powder; subjecting the mixed powder to calcination at a temperature of 1000° C., and holding the temperature for 10 hours, followed by natural cooling and crushing to obtain 1000 g of modified lithium cobalt oxide primary powder.

(2) Weighing tetrabutyl titanate in a molar ratio according to the chemical formula of $Li_{1.0}Al_{0.5}Ti_{1.5}(PO_4)_3$ and dissolving in 50 mL ethanol, then adding 0.5 mL deionized water, stirring evenly, and then weighing and dissolving lithium acetate, aluminum acetate, titanium acetate, and ammonium dihydrogen phosphate in a small amount of ethanol respectively, and stirring evenly. First, adding the tetrabutyl titanate ethanol aqueous solution dropwise to the ammonium dihydrogen phosphate solution, followed by dropwise adding lithium acetate, aluminum acetate, and titanium acetate solutions; stirring for 1.5 hours to obtain a mixture which is heated to 60° C., stirring and evaporating to dryness, then drying in an oven at 80° C. for 15 hours, subjecting a resulting dried powder to calcination at a temperature of 800° C., holding the temperature for 6 hours to obtain a lithium fast ionic conductor intermediate product after natural cooling.

(3) Subjecting the fast ionic conductor intermediate product and the modified lithium cobalt oxide primary powder to three-dimensional mixing for 5 hours, and then subjecting a resulting uniformly mixed powder to calcination in an air atmosphere at a temperature of 500° C., and holding the temperature for 6 hours and natural cooling to obtain a product of 3% fast ionic conductor coated lithium cobalt oxide material.

Comparative Example 3

The preparation method of the fast ionic conductor coated lithium cobalt oxide material of this comparative example comprises the following specific steps:

(1) Weighing and adding lithium carbonate, cobalt tetroxide, magnesium oxide, aluminum oxide, and lanthanum oxide according to the molar ratio of the chemical formula $Li_{1.04}Co_{0.955}Mg_{0.01}Al_{0.03}La_{0.005}O_2$ in a three-dimensional mixer; performing three-dimensional mixing for 3 hours with a ball-to-powder mass ratio of 1.5:1 until uniformly to obtain a mixed powder; subjecting the mixed powder to calcination at a temperature of 1000° C., and holding the temperature for 10 hours, followed by natural cooling and crushing to obtain 1000 g of modified lithium cobalt oxide primary powder.

(2) Weighing tetrabutyl titanate in a molar ratio according to the chemical formula of $Li_{1.1}Al_{0.5}Ti_{1.5}(PO_4)_3$ and dissolving in 50 mL ethanol, then adding 0.5 mL deionized water, stirring evenly, and then weighing and dissolving lithium acetate, aluminum acetate, titanium acetate, and ammonium dihydrogen phosphate in a small amount of ethanol respectively, and stirring evenly. First, adding the tetrabutyl titanate ethanol aqueous solution dropwise to the ammonium dihydrogen phosphate solution, followed by dropwise adding lithium acetate, aluminum acetate, and titanium acetate solutions; stirring for 1.5 hours to obtain a mixture which is heated to 60° C., stirring and evaporating to dryness, then drying in an oven at 80° C. for 15 hours, subjecting a resulting dried powder to calcination at a temperature of 800° C., holding the temperature for 6 hours to obtain a lithium fast ionic conductor intermediate product after natural cooling.

(3) Subjecting the fast ionic conductor intermediate product and the modified lithium cobalt oxide primary powder to three-dimensional mixing for 5 hours, and then subjecting a resulting uniformly mixed powder to calcination in an air atmosphere at a temperature of 500° C., and holding the temperature for 6 hours and natural cooling to obtain a product of 3% fast ionic conductor coated lithium cobalt oxide material.

Comparative Example 4

The preparation method of the nickel-cobalt-manganese material of this comparative example comprises the following specific steps:

(1) Weighing and adding lithium carbonate, nickel-cobalt-manganese hydroxide (Ni:Co:Mn=8:1:1), magnesium oxide, aluminum oxide, and zirconia oxide in a molar ratio according to the chemical formula of $Li_{1.04}(Ni_{0.8}Co_{0.1}Mn_{0.1})_{0.955}Mg_{0.01}Al_{0.03}Zr_{0.005}O_2$ in a three-dimensional mixer, performing mixing for 3 hours with a ball-to-powder mass ratio of 1.5:1 until evenly to obtain a mixed powder; subjecting the mixed powder to calcination at a temperature of 800° C., and holding the temperature for 10 hours, followed by natural cooling and crushing to obtain a modified ternary NiCoMn-811 primary powder.

(2) Weighing and placing the modified ternary NiCoMn-811 primary powder, M' ($TiO_2$:$B_2O_3$=1:1) and M" ($SeO_2$) in a molar ratio according to the chemical formula of $(Li_{1.04}(Ni_{0.8}Co_{0.1}Mn_{0.1})_{0.955}Mg_{0.01}Al_{0.03}Zr_{0.005}O_2\cdot(M'\cdot M'')_{0.005}$ in a three-dimensional mixer and performing three-dimensional mixing with a ball-to-powder mass ration of 1:1 for 1.5 hours until evenly to obtain a mixed powder to calcination at a temperature of 500° C., and holding the temperature for 6 hours and natural cooling to obtain 1000 g of ternary NiCoMn-811.

Comparative Example 5

The preparation method of the fast ionic conductor coated nickel-cobalt-manganese material of this comparative example comprises the following specific steps:

(1) Weighing and adding lithium carbonate, nickel-cobalt-manganese hydroxide (Ni:Co:Mn=8:1:1), magnesium oxide, aluminum oxide, and zirconia oxide in a molar ratio according to the chemical formula of $Li_{1.04}(Ni_{0.8}Co_{0.1}Mn_{0.1})_{0.955}Mg_{0.01}Al_{0.03}Zr_{0.005}O_2$ in a three-dimensional mixer, performing mixing for 3 hours with a ball-to-powder mass ratio of 1.5:1 until evenly to obtain a mixed powder; subjecting the mixed powder to calcination at a temperature of 800° C., and holding the temperature for 10 hours, followed by natural cooling and crushing to obtain a modified ternary NiCoMn-811 primary powder.

(2) Weighing tetrabutyl titanate in a molar ratio according to the chemical formula of $Li_{1.1}Al_{0.5}Ti_{1.5}(PO_4)_3$ and dissolving in 50 mL ethanol, then adding 0.5 mL deionized water, stirring evenly, and then weighing and dissolving lithium acetate, aluminum acetate, titanium acetate, and ammonium dihydrogen phosphate in a small amount of ethanol respectively, and stirring evenly. First, adding the tetrabutyl titanate ethanol aqueous solution dropwise to the ammonium dihydrogen phosphate solution, followed by dropwise adding lithium acetate, aluminum acetate, and titanium acetate solutions; stirring for 1.5 hours to obtain a mixture which is heated to 60° C., stirring and evaporating to dryness, then drying in an oven at 80° C. for 15 hours, subjecting a resulting dried powder to calcination at a temperature of 800° C., holding the temperature for 6 hours to obtain a lithium fast ionic conductor intermediate product after natural cooling.

(3) Subjecting the fast ionic conductor intermediate product and the modified ternary NiCoMn-811 primary powder to three-dimensional mixing for 5 hours, and then subjecting a resulting uniformly mixed powder to calcination in an air atmosphere at a temperature of 500° C., and holding the temperature for 6 hours and natural cooling to obtain a product of 3% fast ionic conductor coated ternary NiCoMn-811 material.

Results Comparison:

The specific preparation methods of the lithium batteries using the compounds of Examples 1-7 and Comparative Examples 1-5 are as follows:

(1) Mixing Lithium compound (prepared in Examples 1-7 and Comparative Examples 1-5), polyvinylidene fluoride, and conductive carbon in a mass ratio of 90:5:5, and adding NMP (N-methylpyrrolidone), stirring to make a slurry and coating it on an aluminum foil, followed by drying at 80° C. to prepare a cathode piece.

(2) Assembling a CR2430 button cell with the cathode piece of step (1), a lithium piece, an electrolyte and a separator in a Take the positive pole piece, lithium piece, electrolyte and diaphragm prepared in step (1) as raw materials, and assemble the CR2430 button battery in a glove compartment.

The test method is as follows:

Capacity test: Take 7 repetitions of the batteries prepared from the compounds of Comparative Examples 1-2, 4-5 and Example 1-3, and charge them to the voltage of V1 at a constant current rate of 0.1 C at a room temperature of 25° C. Furtherly, under a constant voltage of V1, charge them until the current is lower than 0.05 C to reach a fully charged state. Then discharge the battery at a constant current to V2 at a rate of 0.1 C and obtain the discharge capacity. The discharge gram capacity at a rate of 0.1 C can be calculated by the following formula: discharge gram capacity=discharge capacity/mass of the cathode material.

Cycle performance test: At room temperature 25° C., charging-discharging and storing are performed alternatively, that is, storing after a charge-discharge process, and then performing a charge-discharge test to proceed a cyclic test. Cycle capacity retention rate=(discharge capacity at the 50th cycle/discharge capacity at the first cycle)×100%.

Different lithium-transition metal oxides have different requirements for charging and discharging voltage in capacity test and cycle test, which are specified as follows:

When the fast ionic conductor coated lithium-transition metal oxide in the positive pole pieces of Example 2 and Comparative Examples 4-5 comprises a ternary 811 material, the discharge capacity per gram is tested at 0.1 C to 3.0-4.25 V and the cycle performance is tested at 0.1 C to a charge-discharge voltage of 3.0-4.25 V. The results are shown in Table 1.

TABLE 1

| | Capacity per gram | | |
|---|---|---|---|
| No. | Charging capacity per gram (mAh/g) | Discharging capacity per gram (mAh/g) 4.25 V/0.1 C | Capacity per gram after 10 discharging cycles (mAh/g) 4.65 V/1.0 C |
| Example 2 | 228 | 212.6 | 196 |
| Comparative example 4 | 227 | 211.5 | 180 |
| Comparative example 5 | 228 | 212.2 | 162 |

When the fast ionic conductor-coated lithium-transition metal oxide in the positive pole pieces of Comparative Example 1-2 and Examples 1 and 3 comprises the high-voltage lithium-cobalt oxide, the discharge capacity per gram is tested at 0.1 C to 3.0-4.55 V. The cycle performance is tested at 0.5 C to a charge-discharge voltage of 3.0-4.62 V/4.65 V, and the results are shown in Table 2.

TABLE 2

| | Capacity per gram | | |
|---|---|---|---|
| No. | Charging capacity per gram (mAh/g) | Discharging capacity per gram (mAh/g) 4.55 V/0.1 C | capacity per gram after 3 discharging cycles (mAh/g) 4.65 V/0.5 C |
| Example 1 | 211.2 | 199.6 | 221.3 |
| Example 3 | 212 | 200 | 219.2 |
| Comparative Example 1 | 211.6 | 195.4 | 213.4 |
| Comparative Example 2 | 210.6 | 200.2 | 219.7 |

FIG. 1 is an X-ray diffraction spectrum of the intermediate lithium fast ionic conductor and the product of a reaction between the intermediate lithium fast ionic conductor and the compound M'·M" in Example 1 of the present invention. It can be seen from FIG. 1 that the fast ionic conductor coated lithium-cobalt oxide product prepared in Example 1 contains LATP M'M' fast ionic conductor.

Figure 2:
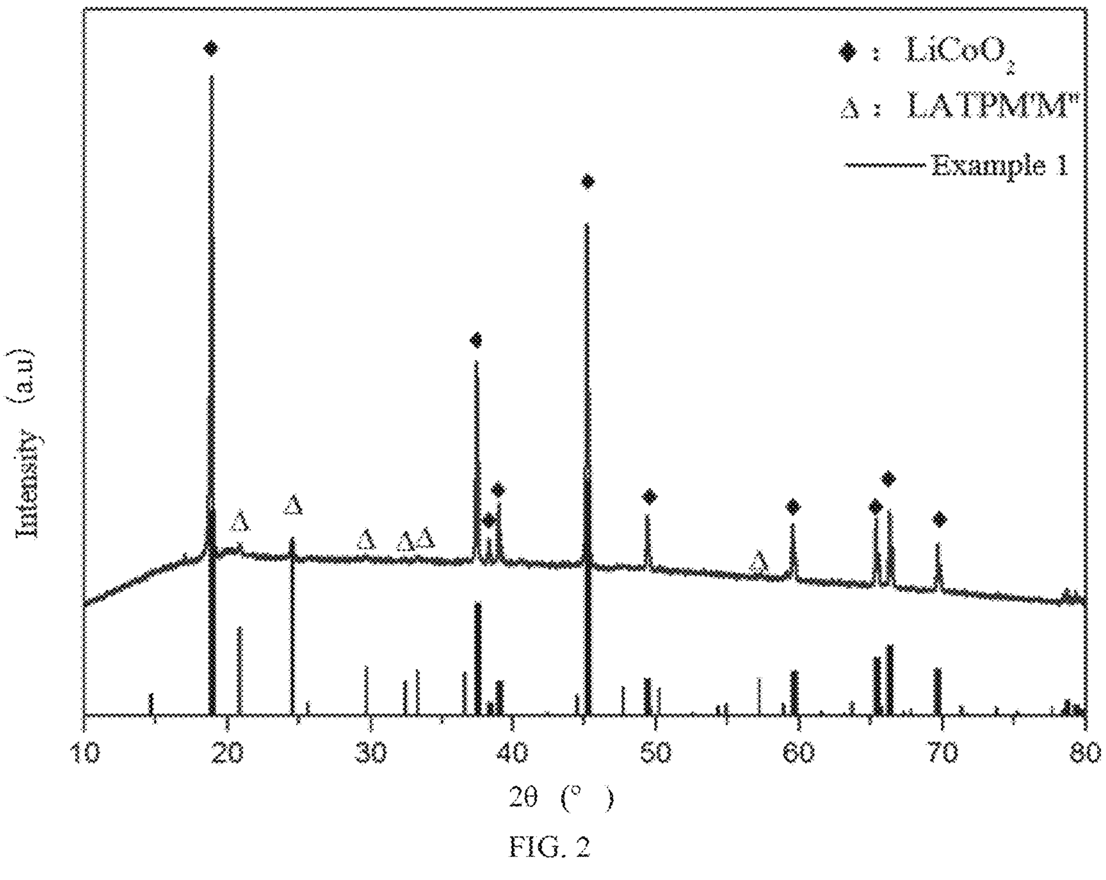
FIG. 2 is an X-ray diffraction spectrum of the 3% lithium fast ionic conductor coated lithium cobalt oxide product in Example 1 of the present invention.

FIG. 2 is an X-ray diffraction spectrum of the 3% lithium fast ionic conductor coated lithium-cobalt oxide product in Example 1 of the present invention. It can be seen from FIG. 2 that the fast ionic conductor coated lithium cobalt oxide product prepared in Example 1 contains $LiCoO_2$ phase and LATP M'M" phase, indicating that LATP M'M" has been coated on the surface of LiCoO2.

Figure 5:
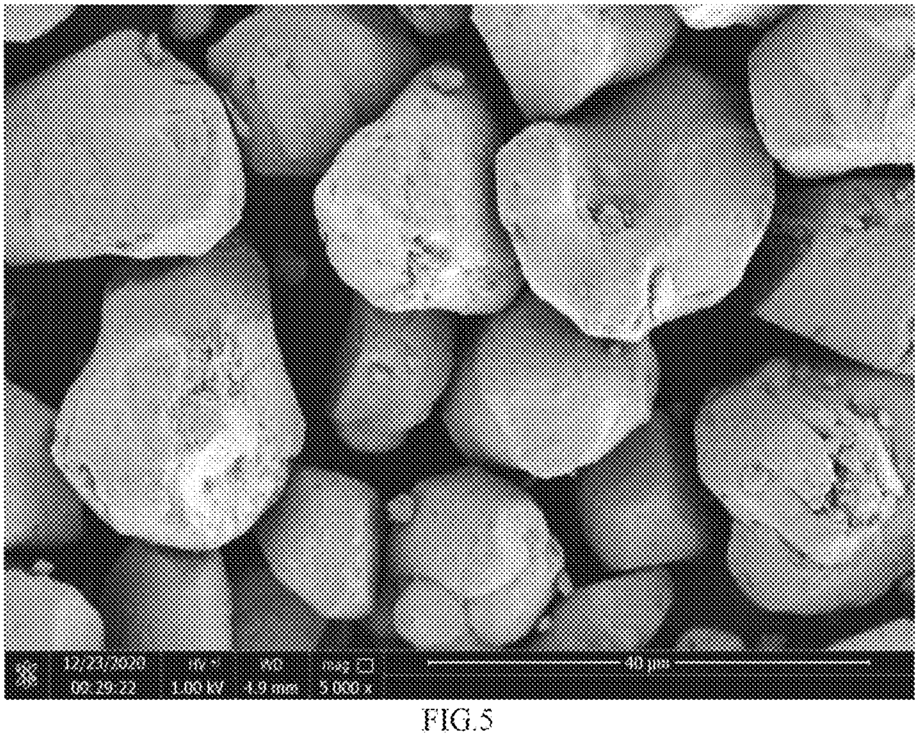
FIG. 5 is a field emission scanning electron microscope image of the surface coating morphology of Example 1 of the present invention (magnification 5000 times)

FIG. 5 is a field emission scanning electron microscope image of the surface coating morphology of the product in Example 1 of the present invention (magnification 5000 times). It can be seen from FIG. 5 that the surface of the fast ionic conductor coated lithium-transition metal oxide material of Example 1 has a uniform coating.

Figure 3:
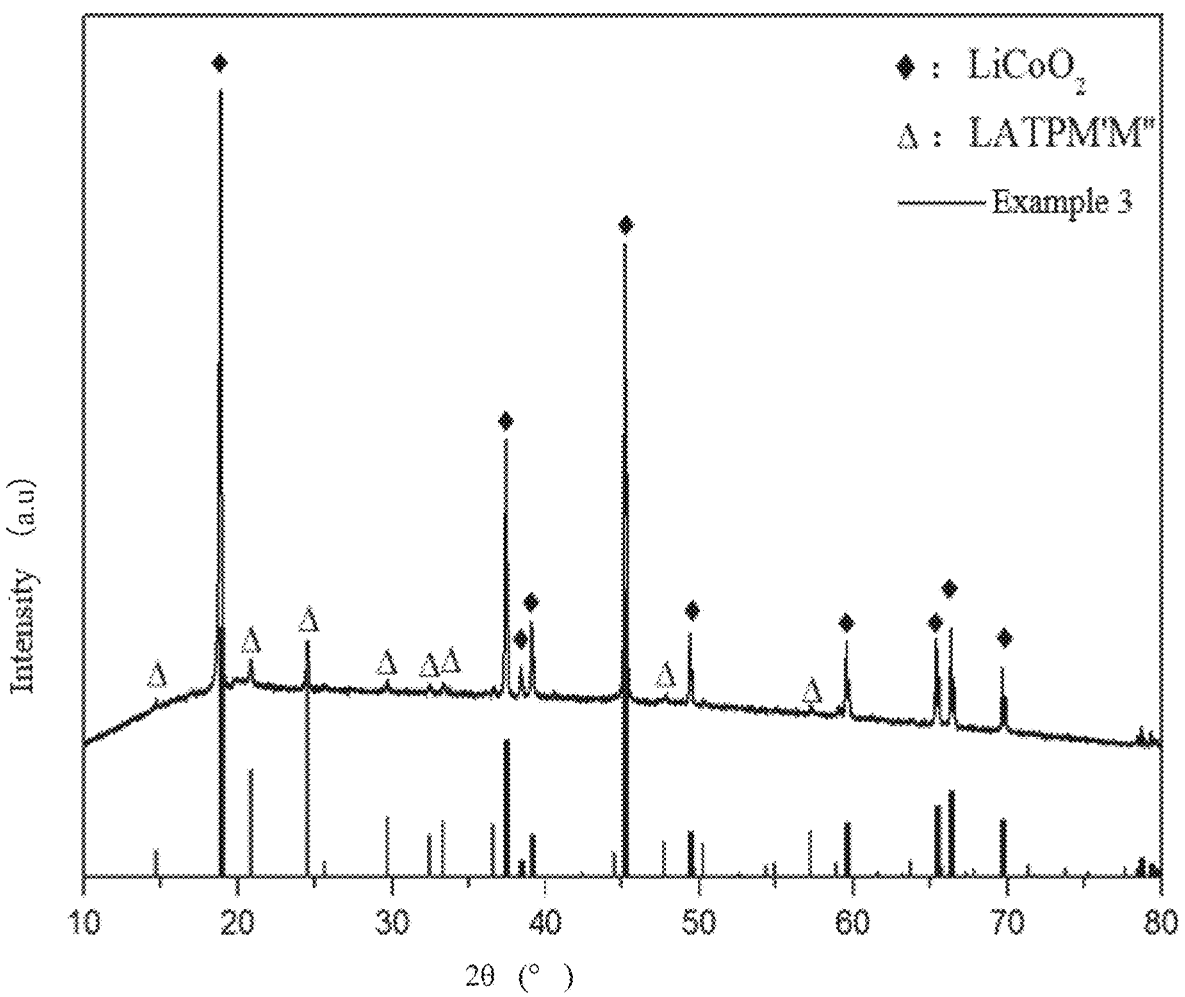
FIG. 3 is an X-ray diffraction spectrum of the 5% lithium fast ionic conductor coated lithium cobalt oxide product in Example 3 of the present invention.

The method for characterizing the electrical properties of the fast ionic conductor coated lithium-transition metal oxide materials in the present invention is as follows:

FIG. 3 is an X-ray diffraction spectrum of the 5% lithium fast ionic conductor coated lithium cobalt oxide product in Example 3 of the present invention. Among them, the cycle performance of the modified lithium cobalt oxide material coated with the fast ionic conductor prepared in Example 3 and in Example 1 are all better than that of the single-coated lithium cobalt oxide material. The lithium-cobalt oxide material prepared in Example 1 has the best cycle performance and capacity, while in Example 3 the coating amount are increased and the capacity is decreased, but the cycle performance trend remains unchanged. The above results indicate that the fast ionic conductor coating can improve the cycle performance of lithium cobalt oxide, but the coating amount cannot be too much because the capacity will decrease.

In Comparative Example 1 it is coated with oxide, and the capacity decreases significantly; Comparative Example 2 is the fast ionic intermediate product, the capacity change is small but the cycle attenuation is obvious. The single-coated fast ionic conductor has the problem of matching between the substrate and the surface layer, which makes the cycle attenuation proceed fast.

Figure 4:
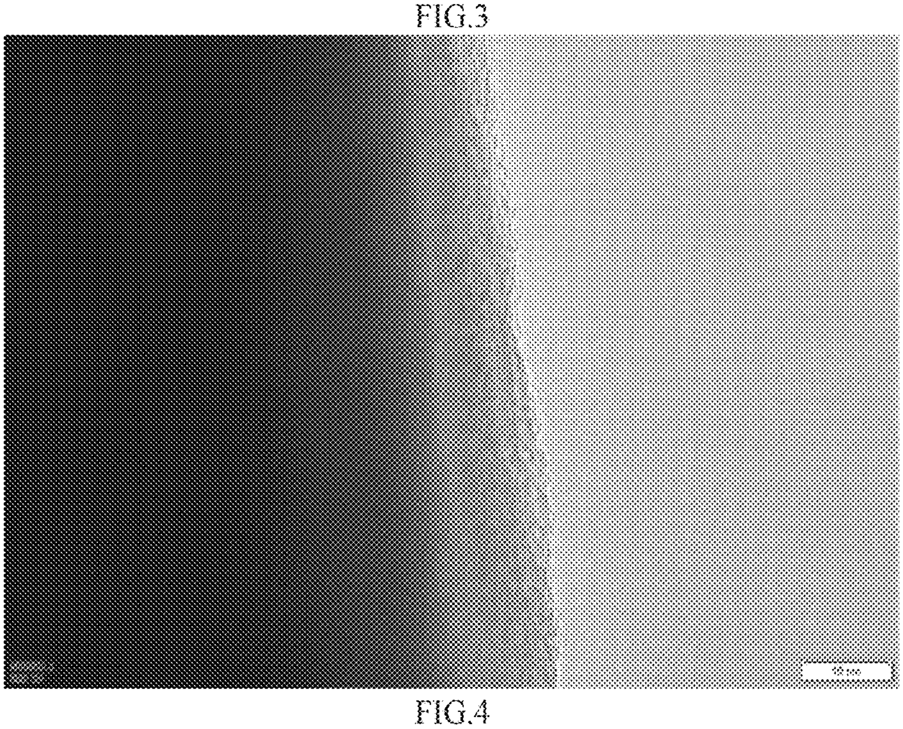
FIG. 4 is a high-resolution transmission electron microscope image of the surface coating morphology of the 3% lithium fast ionic conductor coated modified lithium cobalt oxide in Example 1 of the present invention.

FIG. 4 is a high-resolution transmission electron microscope image of the surface coating morphology of the 3% lithium fast ionic conductor coated modified lithium-cobalt oxide in Example 1 of the present invention. The TEM of FIG. 4 shows that there is an obvious transition layer between the cathode material substrate and the surface layer material, which makes the cathode material substrate and the coating material tightly combined and is beneficial to improve the high-pressure cycle performance.

Figure 6:
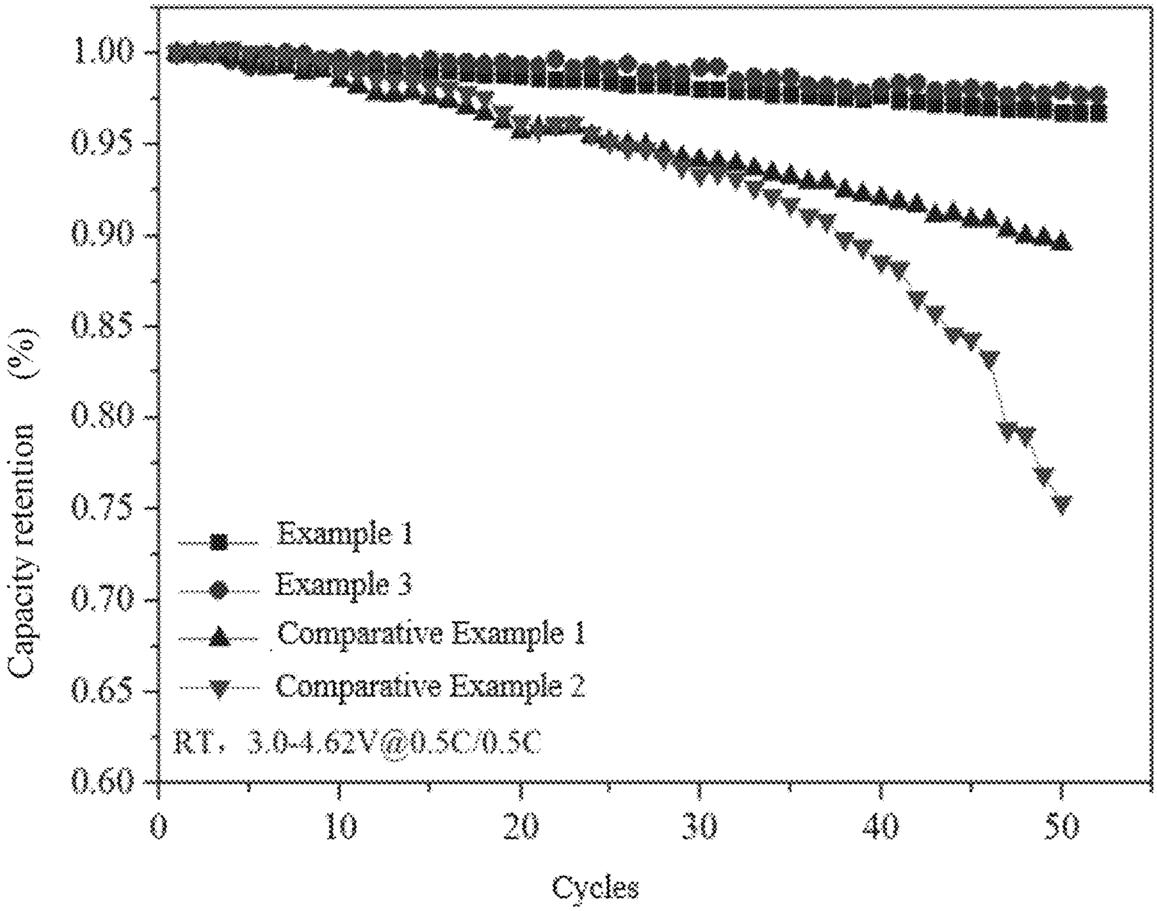
FIG. 6 is the cycle curve obtained by charge and discharge tests of the half-cell assembled with the product in Example 1, Example 3, and Comparative Example 1-2 of the invention at 0.5 C/0.5 C to 3.0-4.62 V.
Figure 7:
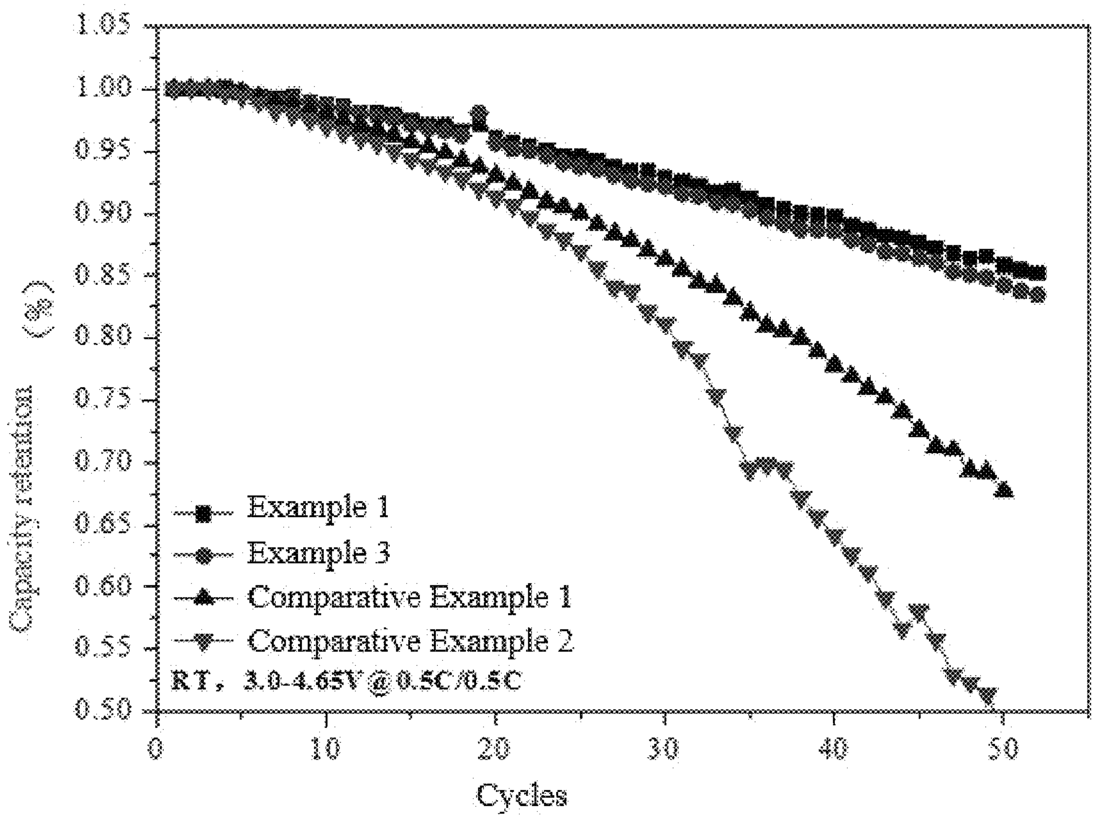
FIG. 7 is the cycle curve obtained by the charge and discharge tests of the half-cell assembled with the product in Example 1, Example 3, and Comparative Example 1-2 of present invention at 0.5 C/0.5 C to 3.0-4.65 V.

FIG. 6 is the cycle curve obtained by charge and discharge tests of the half-cell assembled with the product in Example 1, Example 3, and Comparative Example 1-2 of the invention at 0.5 C/0.5 C to 3.0-4.62 V; FIG. 7 is the cycle curve obtained by the charge and discharge tests of the half-cell assembled with the product in Example 1, Example 3, and Comparative Example 1-2 of present invention at 0.5 C/0.5 C to 3.0-4.65 V. It can be seen from FIGS. 6 and 7 that after coating $Li_cAl_dTi_eM'_fM''_g(PO_4)_3$, the obtained product has excellent cycle performance at 4.62V, and the cycle performance at 4.65V is also improved.

The embodiments of the present invention have been described in detail above with reference to the accompanying drawings. However, the present invention is not limited to the above-mentioned embodiments. Within the scope of knowledge possessed by those of ordinary skill in the art, various modifications can be made without departing from the purpose of the present invention. Variety. In addition, in the case of no conflict, the embodiments of the present invention and the features in the embodiments can be combined with each other.

The invention claimed is:

1. A preparing method of a fast ionic conductor coated lithium-transition metal oxide material, comprising the following steps:

1) mixing a lithium source, a transition metal compound and an M-containing compound, stirring, performing calcination, and crushing to obtain a lithium-transition metal oxide primary powder;

2) mixing the lithium-transition metal oxide primary powder with M' and M", performing calcination, crushing, and screening to obtain a lithium-transition metal oxide material powder;

3) dissolving a crosslinking agent in a mixture of alcohol and water to obtain a solution A, dissolving a lithium salt, an aluminum salt and a phosphorus source in an alcohol respectively, and stirring and mixing resulting solutions to obtain a solution B;

4) mixing the solution A and the solution B, stirring, heating, and drying, slightly disaggregating a resulting product to obtain a fast ionic conductor precursor, subjecting the fast ionic conductor precursor to calcination, crushing, and screening to obtain a fast ionic conductor intermediate product;

5) mixing the fast ionic conductor intermediate product with the lithium-transition metal oxide material powder and performing calcination, followed by slightly disaggregating a resulting mixture to obtain the fast ionic conductor coated lithium-transition metal oxide material; wherein in step 1), the M-containing compound is at least one selected from the group consisting of an M-containing oxide, an M-containing hydroxide, an M-containing acetate, an M-containing carbonate and an M-containing basic carbonate, wherein M is at least one selected from the group consisting of Ba, La, Ti, Zr, V, Nb, Cu, Mg, B, S, Sr, Al, Sc, Y, Ga, Zn, W, Mo, Si, Sb and Ca; in step 2), M' is an oxide of one or two elements selected from the group consisting of La, Al, Sc, Ti, Y, V and Zr, and M" is an oxide of one element selected from the group consisting of Ni, Se, Fe, Mn and Co;

wherein the fast ionic conductor coated lithium-transition metal oxide material having a chemical formula of $(1\text{-}x)L_{1+a}(Ni_{(1-m-n)}Co_nMn_m)_{1-b}MbO_2 \cdot xLi_cAl_dTi_e M'M''_g (PO_4)_3$, wherein $0<x\leq 0.1$, $0\leq a\leq 0.1$, $0\leq b\leq 0.1$, $0\leq m\leq 1$, $0\leq n<1$, $0<c\leq 1$, $0\leq d\leq 1$, $0<e\leq 2$, $0<f\leq 2$, $0\leq g<2$, $1\times c+3\times d+4\times e=9$.

2. The preparation method according to claim 1, wherein the lithium source is at least one selected from the group consisting of lithium carbonate and lithium hydroxide.

3. The preparation method according to claim 1, wherein the transition metal compound is at least one selected from the group consisting of a cobalt source, a nickel source and a manganese source; the transition metal compound is at least one selected from the group consisting of cobalt tetraoxide, cobalt oxyhydroxide, cobalt hydroxide, nickel-cobalt-manganese oxide, nickel-cobalt-manganese hydroxide, manganese hydroxide, nickel hydroxide, nickel oxide and manganese oxide.

4. The preparation method according to claim 1, wherein the crosslinking agent is tetrabutyl titanate;

the lithium salt is at least one selected from the group consisting of lithium carbonate and lithium acetate, and the aluminum salt is at least one selected from the group consisting of aluminum nitrate and aluminum acetate;

the phosphorus source is at least one selected from the group consisting of ammonium dihydrogen phosphate, lithium dihydrogen phosphate, diammonium hydrogen phosphate, phosphoric acid, lithium phosphate and a phosphate ester.

5. The preparation method according to claim 1, wherein the fast ionic conductor intermediate product and the lithium-transition metal oxide material powder are in a mass ratio of (0.01-0.05):(0.95-0.99).

6. The preparation method according to claim 1, wherein the lithium-transition metal oxide material has a layered structure, and a chemical formula of $(1\text{-x})Li_{1+a}(Ni_{(1-m-n)}Co_nMn_m)_{1-b}M_bO_2$, M is at least one selected from the group consisting of Ba, La, Ti, Zr, V, Nb, Cu, Mg, B, S, Sr, Al, Sc, Y, Ga, Zn, W, Mo, Si, Sb and Ca, wherein $0 \le a \le 0.1$, $0 < b \le 0.1$, 05m≤1, $0 \le n \le 1$.

7. The preparation method according to claim 1, wherein the fast ionic conductor has a chemical formula of $Li_cAl_dTi_eM'_fM''_g(PO_4)_3$, M' is an oxide of one or two elements selected from the group consisting of La, Al, Sc, Ti, Y, V and Zr, wherein M'' is an oxide of one element selected from the group consisting of Ni, Se, Fe, Mn and Co, wherein $0 \le c \le 1$, $0 < d \le 1$, $0 < e \le 2$, $0 \le f \le 2$, $0 \le g < 2$, and $1 \times c + 3 \times d + 4 \times e = 9$.

8. A preparing method of a fast ionic conductor coated lithium-transition metal oxide material-according to claim 1, comprising the following steps:

1) mixing a lithium source, a transition metal compound and an M-containing compound thoroughly, performing calcination, and crushing to obtain a lithium-transition metal oxide primary powder;
2) dissolving a cross-linking agent, a lithium salt, an aluminum salt and a phosphorus source in an alcohol respectively, mixing resulting solutions and stirring to obtain a mixed solution a;
3) dissolving M' and M'' in an acidic alcohol to obtain a mixed solution b;
4) adding the lithium-transition metal oxide primary powder into an alcohol solution, stirring to disperse to obtain a lithium-transition metal oxide suspension;
5) adding the lithium-transition metal oxide suspension to the mixed solution b, stirring, heating and evaporating to dryness, drying, slightly disaggregating a resulting product to obtain a lithium-transition metal oxide intermediate product;
6) adding the lithium-transition metal oxide intermediate product to the mixed solution a, stirring, heating and evaporating to dryness, then drying to obtain a dried product, subjecting the dried product to calcination, twin rolling, and slightly disaggregating to obtain a fast ionic conductor coated lithium-transition metal oxide material; wherein in step 1), the M-containing compound is at least one selected from the group consisting of an M-containing oxide, an M-containing hydroxide, an M-containing acetate, an M-containing carbonate and an M-containing basic carbonate, wherein M is at least one selected from the group consisting of Ba, La, Ti, Zr, V, Nb, Cu, Mg, B, S, Sr, Al, Sc, Y, Ga, Zn, W, Mo, Si, Sb and Ca; in step 2), M'is an oxide of one or two elements selected from the group consisting of La, Al, Sc, Ti, Y, V and Zr, and M'' is an oxide of one element selected from the group consisting of Ni, Se, Fe, Mn and Co;

wherein the fast ionic conductor coated lithium-transition metal oxide material having a chemical formula of $(1\text{-x})Li_{1+a}(Ni_{(1-m-n)}Co_nMn_m)_{1-b}M_bO_2 \cdot xLi_cAl_dTi_eM'_fM''_g(PO_4)_3$, wherein $0 < x \le 0.1$, $0 \le a \le 0.1$, $0 < b \le 0.1$, $0 \le m \le 1$, $0 \le n \le 1$, $0 \le c \le 1$, $0 < d \le 1$, $0 < e \le 2$, $0 \le f \le 2$, $0 \le g \le 2$, $1 \times c + 3 \times d + 4 \times e = 9$.

9. The preparation method according to claim 8, wherein the lithium source is at least one selected from the group consisting of lithium carbonate and lithium hydroxide.

10. The preparation method according to claim 8, wherein the transition metal compound is at least one selected from the group consisting of a cobalt source, a nickel source and a manganese source; the transition metal compound is at least one selected from the group consisting of cobalt tetraoxide, cobalt oxyhydroxide, cobalt hydroxide, nickel-cobalt-manganese oxide, nickel-cobalt-manganese hydroxide, manganese hydroxide, nickel hydroxide, nickel oxide and manganese oxide.

11. The preparation method according to claim 8, wherein the crosslinking agent is tetrabutyl titanate;

the lithium salt is at least one selected from the group consisting of lithium carbonate and lithium acetate, and the aluminum salt is at least one selected from the group consisting of aluminum nitrate and aluminum acetate;

the phosphorus source is at least one selected from the group consisting of ammonium dihydrogen phosphate, lithium dihydrogen phosphate, diammonium hydrogen phosphate, phosphoric acid, lithium phosphate and a phosphate ester.

12. The preparation method according to claim 8, wherein the lithium-transition metal oxide material has a layered structure, and a chemical formula of $(1\text{-x})Li_{1+a}(Ni_{(1-m-n)}Co_nMn_m)_{1-6}M_bO_2$, Mis at least one selected from the group consisting of Ba, La, Ti, Zr, V, Nb, Cu, Mg, B, S, Sr, Al, Sc, Y, Ga, Zn, W, Mo, Si, Sb and Ca, wherein $0 \le a \le 0.1$, $0 < b \le 0.1$, 05m≤1, $0 \le n \le 1$.

13. The preparation method according to claim 8, wherein the fast ionic conductor has a chemical formula of $Li_cAl_dTi_eM'_fM''_g(PO_4)_3$, M' is an oxide of one or two elements selected from the group consisting of La, Al, Sc, Ti, Y, V and Zr, wherein M'' is an oxide of one element selected from the group consisting of Ni, Se, Fe, Mn and Co, wherein $0 \le c \le 1$, $0 < d \le 1$, $0 < e \le 2$, $0 \le f \le 2$, $0 \le g \le 2$, and $1 \times c + 3 \times d + 4 \times e = 9$.

* * * * *